(12) United States Patent
Chang

(10) Patent No.: US 10,539,327 B2
(45) Date of Patent: Jan. 21, 2020

(54) COMBUSTOR LINER

(71) Applicant: United Technologies Corporation, Hartford, CT (US)

(72) Inventor: Hoyt Y. Chang, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 188 days.

(21) Appl. No.: 14/917,379

(22) PCT Filed: Aug. 19, 2014

(86) PCT No.: PCT/US2014/051580
§ 371 (c)(1),
(2) Date: Mar. 8, 2016

(87) PCT Pub. No.: WO2015/038293
PCT Pub. Date: Mar. 19, 2015

(65) Prior Publication Data
US 2016/0215980 A1    Jul. 28, 2016

Related U.S. Application Data

(60) Provisional application No. 61/876,274, filed on Sep. 11, 2013.

(51) Int. Cl.
*F23R 3/00*      (2006.01)
*F23R 3/06*      (2006.01)

(52) U.S. Cl.
CPC ............... *F23R 3/007* (2013.01); *F23R 3/06* (2013.01)

(58) Field of Classification Search
CPC .. F23R 3/00; F23R 3/002; F23R 3/007; F23R 3/50; F23R 3/60; F23R 2900/00005;
(Continued)

(56) References Cited

U.S. PATENT DOCUMENTS 3,965,066 A * 6/1976 Sterman ................. F01D 9/023
                                                                                     415/115
4,380,896 A * 4/1983 Wiebe ....................... F23R 3/50
                                                                                      60/753

(Continued)

FOREIGN PATENT DOCUMENTS

EP           1152191       11/2001
GB           2432902       6/2007

OTHER PUBLICATIONS

International Preliminary Report on Patentability for PCT Application No. PCT/US2014/051580 completed Mar. 15, 2016.
(Continued)

*Primary Examiner* — Jason H Duger
(74) *Attorney, Agent, or Firm* — Carlson, Gaskey & Olds, P.C.

(57) ABSTRACT

A combustor includes a liner and a support. The liner includes first and second spaced apart liner walls defining a combustion chamber therebetween, and an end wall joining the first and second liner walls at a forward end. The support is configured to resiliently support the liner and includes first and second spaced apart support walls having first and second retainers configured to capture aft ends of the first and second liner walls. A gas turbine engine and a method of assembling a combustor are also disclosed.

20 Claims, 4 Drawing Sheets

(58) Field of Classification Search
CPC .............. F23R 2900/00017; F23R 3/06; F23R 2900/03044; F02C 3/14; F02C 7/24; F02K 1/80; F02K 1/82; F02K 1/822; Y02T 50/672; F05D 2300/6033; F05D 2300/2261
USPC .......................................................... 60/800
See application file for complete search history.

(56) References Cited

U.S. PATENT DOCUMENTS

| | | | |
|---|---|---|---|
| 4,512,159 A | 4/1985 | Memmen | |
| 4,567,730 A * | 2/1986 | Scott | F23R 3/007 60/752 |
| 5,201,799 A | 4/1993 | Johnson | |
| 5,291,732 A | 3/1994 | Halila | |
| 6,397,603 B1 | 6/2002 | Edmondson et al. | |
| 6,571,560 B2 | 6/2003 | Tatsumi et al. | |
| 6,647,729 B2 * | 11/2003 | Calvez | F23R 3/60 60/753 |
| 6,655,147 B2 | 12/2003 | Farmer et al. | |
| 6,675,585 B2 * | 1/2004 | Calvez | F23R 3/60 60/753 |
| 6,895,757 B2 | 5/2005 | Mitchell et al. | |
| 6,895,761 B2 | 5/2005 | Mitchell et al. | |
| 6,904,757 B2 | 6/2005 | Mitchell et al. | |
| 6,931,855 B2 | 8/2005 | Glessner et al. | |
| 7,234,306 B2 * | 6/2007 | Aumont | F23R 3/60 60/753 |
| 7,237,389 B2 | 7/2007 | Ryan et al. | |
| 7,546,743 B2 | 6/2009 | Bulman et al. | |
| 8,141,370 B2 | 3/2012 | Bulman et al. | |
| 8,215,115 B2 | 7/2012 | Adair et al. | |
| 8,336,317 B2 * | 12/2012 | Blanchard | F01D 5/082 60/806 |
| 8,616,854 B2 * | 12/2013 | Mahan | F01D 5/026 416/245 R |
| 9,447,974 B2 * | 9/2016 | Max | F23R 3/14 |
| 2002/0108378 A1 | 8/2002 | Ariyoshi et al. | |
| 2002/0184888 A1 | 12/2002 | Calvez et al. | |
| 2004/0261419 A1 | 12/2004 | McCaffrey et al. | |
| 2005/0086945 A1 | 4/2005 | Tiemann | |
| 2010/0257864 A1 | 10/2010 | Prociw et al. | |
| 2012/0328366 A1 | 12/2012 | Jarmon et al. | |
| 2013/0152591 A1 | 6/2013 | Dery | |

OTHER PUBLICATIONS

International Search Report for PCT Application No. PCT/US2014051580 completed Dec. 2, 2014.
Supplementary European Search Report for EP Application No. 14843708.0 dated Sep. 6, 2017.

* cited by examiner

COMBUSTOR LINER

CROSS-REFERENCE TO RELATED APPLICATION

This application claims priority to U.S. Provisional Application No. 61/876,274, filed Sep. 11, 2013.

BACKGROUND

This disclosure relates to a liner for a gas turbine engine combustion chamber.

A gas turbine engine typically includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive at least the compressor. The compressor section typically includes low and high pressure compressors, and the turbine section includes low and high pressure turbines. Some gas turbine engines include a fan section driven by the turbine section.

The combustor section typically includes one or more combustion chambers. Each combustor may include a liner or heat shield to carry a thermal load and a support structure to carry a pressure load exerted on the combustor during operation. The liner or heat shield defines a combustion chamber. In some current designs, both the heat shield and the support structure are metallic. The heat shield is generally attached to the support structure via threaded studs. The metallic heat shields may need to be periodically replaced due to failure induced by the extremely high temperatures generated in the combustor section.

Ceramic-based materials are known to have increased heat resistance as compared to metallic materials. However, ceramic materials have decreased strength capacity. The inclusion of threaded holes to receive a fastener may introduce local flaws into a ceramic structure, which may lead to cracking or breakage of the structure.

SUMMARY

A combustor according to an example of the present disclosure includes a liner including first and second spaced apart liner walls defining a combustion chamber therebetween, an end wall joining the first and second liner walls at a forward end, and a support configured to resiliently support the liner. The support includes first and second spaced apart support walls having first and second retainers configured to capture aft ends of the first and second liner walls.

In a further embodiment of the foregoing embodiment, the liner includes a ceramic matrix composite material and the support includes a metallic material.

In a further embodiment of any of the foregoing embodiments, a matrix of the ceramic matrix composite material is silicon carbide.

In a further embodiment of any of the foregoing embodiments, the aft ends of the first and second liner walls each include a sloped edge extending towards an interior of the combustion chamber and angled forward towards the end wall, the sloped edges received in the first and second retainers.

In a further embodiment of any of the foregoing embodiments, the support includes at least one spring member arranged to resiliently support the liner.

In a further embodiment of any of the foregoing embodiments, the at least one spring member comprises a first spring arranged at a first intersection of the end wall and the first liner wall and a second spring arranged at a second intersection of the end wall and the second liner wall.

In a further embodiment of any of the foregoing embodiments, the at least one spring member is attached to the support.

In a further embodiment of any of the foregoing embodiments, at least one of the first and second liner walls include at least one through-hole.

In a further embodiment of any of the foregoing embodiments, the support includes perforations configured to facilitate impingement cooling of the combustor.

In a further embodiment of any of the foregoing embodiments, the first and second retainers are hooks extending forward towards the end wall.

In a further embodiment of any of the foregoing embodiments, the support further comprises a bulkhead arranged forward of the end wall.

A gas turbine engine according to an example of the present disclosure includes a fuel nozzle, a combustion chamber in fluid communication with the fuel nozzle defined by first and second spaced apart liner walls and an end wall joining the first and second liner walls at a forward end, and a support configured to resiliently support the combustion chamber, the support including first and second spaced apart support walls having first and second retainers configured to capture aft ends of the first and second liner walls.

In a further embodiment of any of the foregoing embodiments, the fuel nozzle is in fluid communication with the combustion chamber via a through-hole in the end wall.

In a further embodiment of any of the foregoing embodiments, at least one of the first and second liner walls and the end wall includes a ceramic matrix composite material.

In a further embodiment of any of the foregoing embodiments, the support includes a metallic material.

In a further embodiment of any of the foregoing embodiments, the first liner wall and the first support wall are radially outward from the second liner wall and the second support wall, respectively, with respect to a central engine axis.

In a further embodiment of any of the foregoing embodiments, the support includes at least one spring member arranged to resiliently support the liner.

A method of assembling a combustor for a gas turbine engine according to an example of the present disclosure includes providing a support, the support including first and second spaced apart support walls having first and second retainers, resiliently mounting a liner to the support, the liner including first and second spaced apart liner walls defining a combustion chamber therebetween, an end wall joining the first and second liner walls at a forward end, and capturing aft ends of the first and second liner walls in the first and second retainers, respectively.

In a further embodiment of any of the foregoing embodiments, the method further includes providing at least one spring member between the liner and the support.

In a further embodiment of any of the foregoing embodiments, the second support wall is provided subsequent to resiliently mounting the liner to the support.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
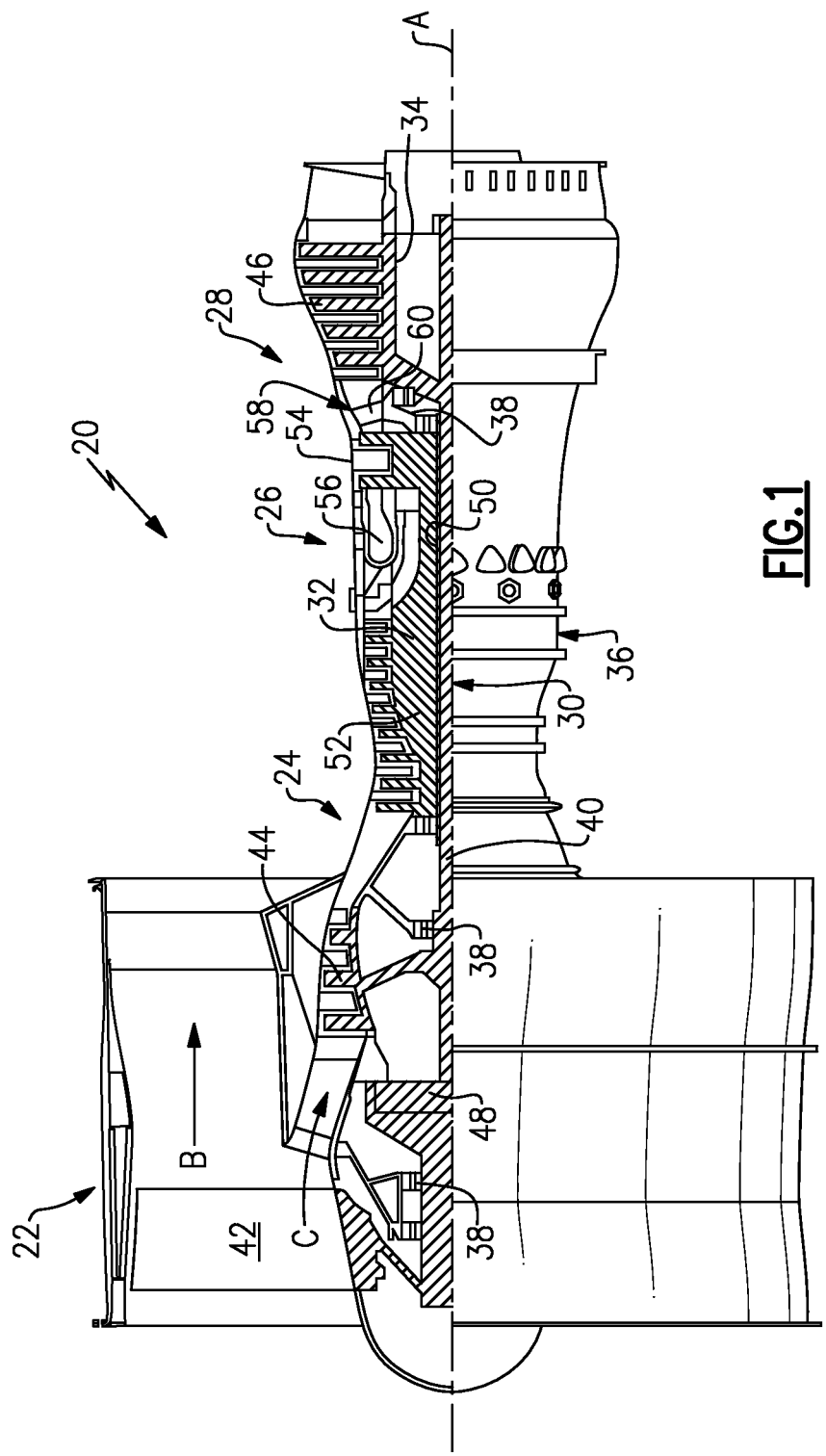
FIG. 1 schematically illustrates an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow flowpath C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by air in the bypass flowpath B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
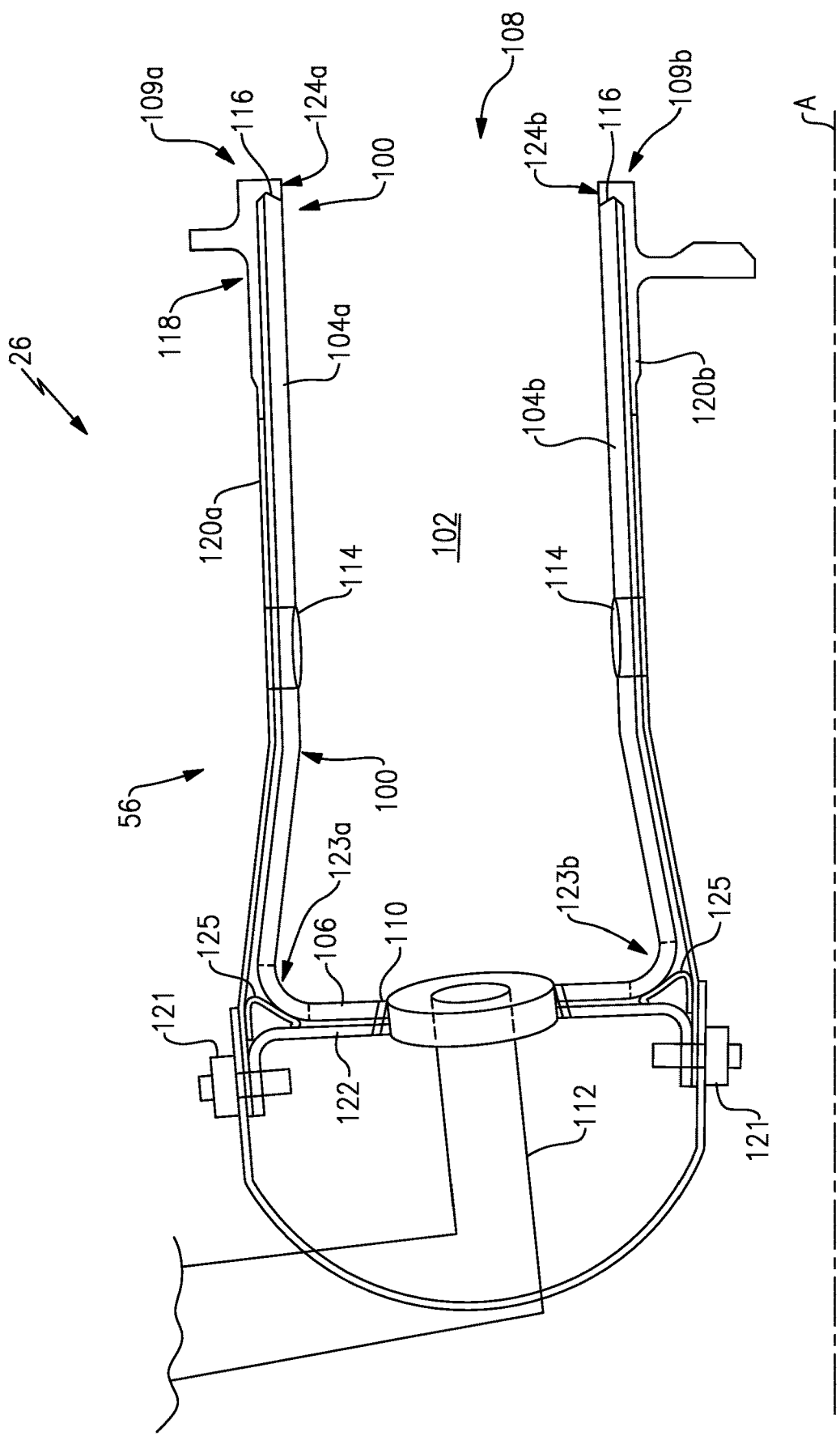
FIG. 2 illustrates an example combustor.

FIG. 2 shows a cross section of the combustor 56. The combustor includes a liner 100, which is shown in isolation in FIG. 3. The liner 100 defines a combustion chamber 102. The liner 100 includes first and second spaced apart liner walls 104a, 104b and an end wall 106 joining the first and second liner walls 104a, 104b. The end wall 106 joins the first and second liner walls 104a, 104b at a forward end with respect to the engine 20. An aft end 108 of the combustion chamber 102 is open. Aft ends 109a, 109b of each of the liner walls 104a, 104b, respectively, each include a sloped edge 116 extending radially inward towards an interior of the combustion chamber 108 and angling forward towards the end wall 106.

The end wall 106 includes a through-hole 110 for the injection of fuel with a fuel nozzle 112. The first and second liner walls 104a, 104b can optimally include at least one through-hole 114 (multiple shown), which can provide for air dilution during combustor 56 operation.

In one example, the liner 100 is a ceramic-based material, such as a ceramic matrix composite (CMC) material. CMC materials include a first continuous or discontinuous phase dispersed through a second ceramic-based matrix phase, which can be continuous. In one example, the matrix phase is silicon carbide (SiC). In a further example, the first phase is, or includes, fibers. The fibers can be woven or arranged in unidirectional layers which are stacked together, although other fiber structures can also be used.

The liner 100 can be formed using known processing techniques, for instance, by forming a fabric from the fibrous phase, laying-up the fabric to form the liner 100, impregnating the fibrous phase with the matrix phase, and curing the CMC. The liner 100 can be formed as a single piece. The through-holes 110, 114 can be formed during the lay-up process or can later be machined into a cured CMC liner 100.

Figure 3:
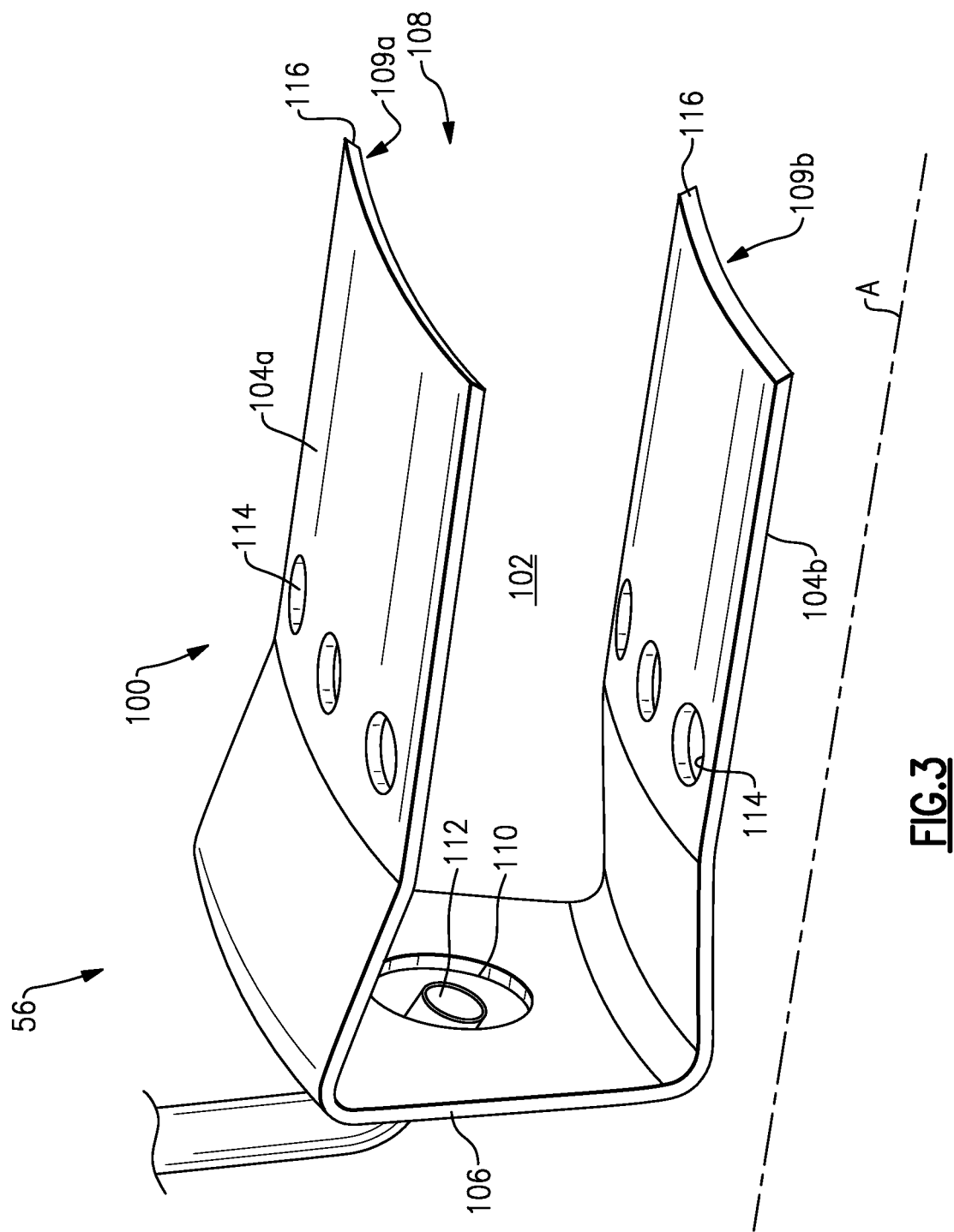
FIG. 3 illustrates an example combustor liner for the example combustor of FIG. 2.

Referring again to FIG. 2 with continued reference to FIG. 3, the liner 100 is mounted in a support structure 118. The support structure 118 includes first and second support walls 120a, 120b and a bulkhead 122. The support wall 120a is a radially outer wall, and the support wall 120b is a radially inner wall. The first and second liner walls 104a, 104b are supported by the first and second support walls 120a, 120b, respectively. The bulkhead 122 supports the end wall 106.

The first and second support walls 120a, 120b include first and second retainers 124a, 124b configured to capture the sloped edges 116 of the first and second liner walls 104a, 104b, respectively. For example, the retainers 124a, 124b are hooks extending in the forward direction towards the end wall 106 and retaining the aft ends 109a, 109b of the liner walls 104a, 104b, respectively, in a radial and axial direction. The support structure 118 may be metallic and can be perforated or include other features to facilitate cooling in the combustor 56. In this regard, the support walls 120a, 120b can be radially spaced from the liner walls 104a, 104b, respectively, to allow cooling air to flow between the liner 100 and the support structure 118. The support walls 120a, 120b may be connected to the bulkhead 122 by fasteners 121.

The liner 100 is resiliently mounted in the support structure 118. That is, the liner 100 is able to move axially and/or radially relative to the support structure 118. One or more spring members 125 may be arranged between the liner 100 and the support structure 118. In the example of FIGS. 2-3, a first spring member 125 is arranged at an intersection 123a of the end wall 106 and the first liner wall 104a. A second spring member 125 is arranged an intersection 123b of the end wall 106 and the second liner wall 104b. In another example, multiple spring members 125 may be arranged between the end wall 106 and the bulkhead 122 and/or between the first and second liner walls 104a, 104b and the first and second support walls 120a, 120b, respectively.

The metallic support structure 118 and the CMC liner 100 are thermally mismatched. The metallic support structure 118 undergoes dimensional changes as temperatures fluctuate within the combustor 56 at a faster rate than the CMC liner 100. The spring members 125 mitigate the thermal mismatch by allowing for radial and axial movement of the CMC liner 100 as the metallic support structure 118 changes dimension. The high temperature capabilities of the CMC liner 100 and the resilient mounting arrangement described herein eliminate the need for a conventional metallic heat shield in the combustor 56.

Figure 4:
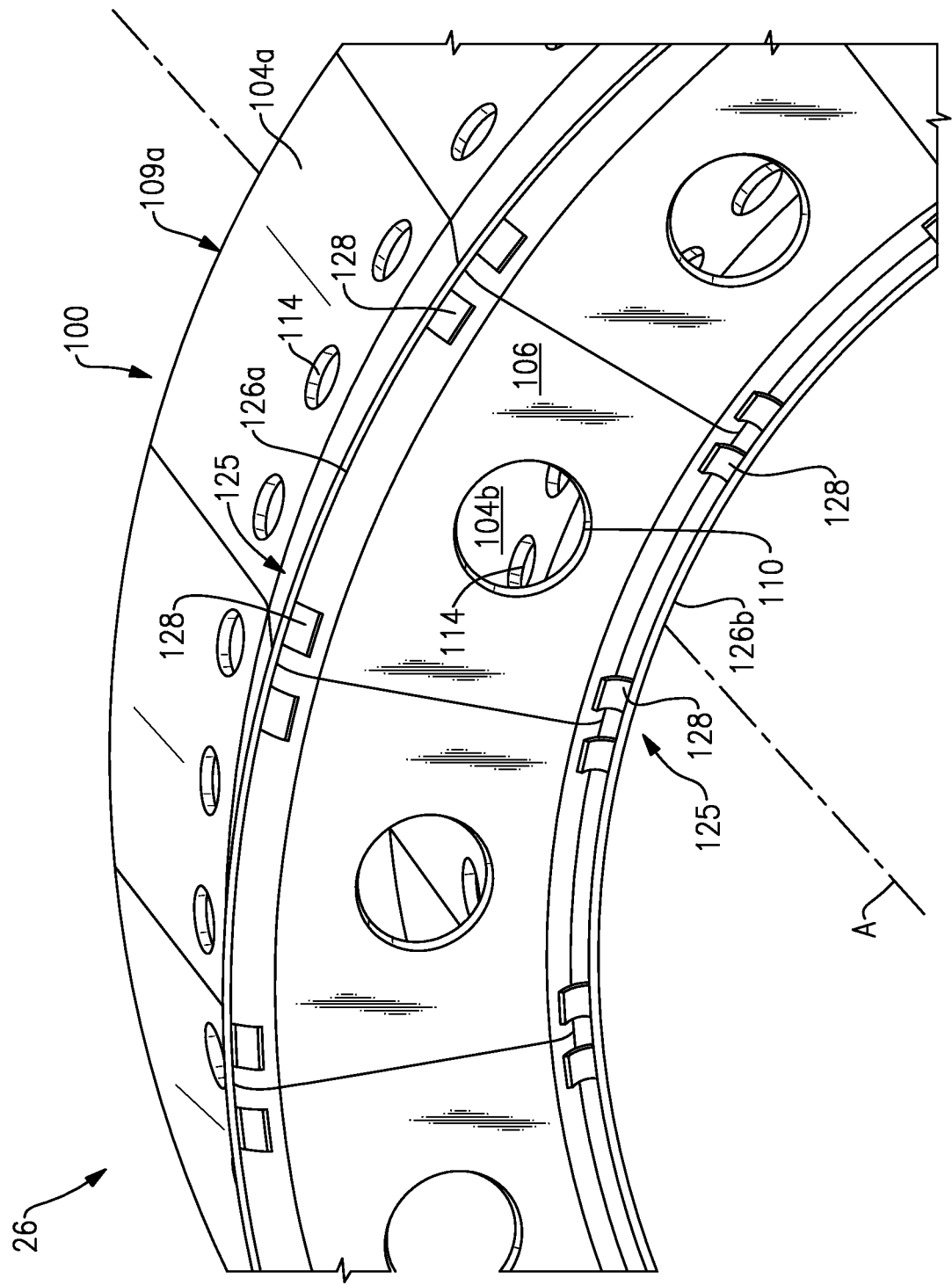
FIG. 4 illustrates an example combustor section including an array of the example combustion chamber liners of FIGS. 2-3.

FIG. 4 shows a perspective, aft-looking view of a portion of the combustor section 26. Multiple liners 100 (i.e., segments) are circumferentially arranged about the central engine axis A. In this example, there is one liner 100 for each fuel nozzle 112. However, it is contemplated that the one or more liners 100 could be made integrally rather than as separate, distinct pieces. The spring members 125 include a ring and resilient tabs 128 extending from the ring. In the example of FIG. 4, the combustor section 26 includes a first ring 126a arranged along a radially outward side of the end wall 106 with respect to the central engine axis A, and a second ring 126b arranged along a radially inward side of the end wall 106. The rings 126a, 126b are attached to the first and second support walls 120a, 120b, respectively (FIGS. 2-3) by welding or by another attachment means. The tabs 128 abut the liner 100. In one example, the radially inner ring 126a is a one-piece full hoop ring, and the radially outer ring 126b is a split-hoop ring.

In the example of FIG. 4, each combustion liner 100 mates with four spring tabs 128 in each of the four corners of the end wall 106. However, in another example, more or less tabs 128 may be used.

During installation, the first support wall 120a and bulkhead 122 may be installed in the combustor section 26 of the engine 20. The sloped edge 116 of the first liner wall 104a is received in the retainer 124a of the first support wall 120a. The liner 100 is pressed in the forward direction and abuts the spring member 125. The second support wall 120b is installed onto the liner 100 by receiving the sloped edge 116 of the second liner wall 104b in the retainer 124b of the second support wall 120b. The first and second support walls 120a, 120b are connected to the bulkhead 122 by the fasteners 121.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A combustor, comprising:
   a liner including a first liner wall and a second liner wall spaced apart from the first liner wall, the first and second liner walls defining a combustion chamber therebetween, an end wall joining the first and second liner walls at a forward end; and
   support configured to resiliently support the liner, the support including a first support wall and a second support wall spaced apart from the first support wall, the first and second support walls having a first retainer and a second retainer, respectively, the first retainer configured to capture an aft end of the first liner wall and the second retainer configured to capture an aft end of the second liner wall.

2. The combustor of claim 1, wherein the liner includes a ceramic matrix composite material and the support includes a metallic material.

3. The combustor of claim 2, wherein a matrix of the ceramic matrix composite material is silicon carbide.

4. The combustor of claim 1, wherein the aft end of the first liner wall and the aft end of the second liner wall each include a sloped edge extending towards an interior of the combustion chamber and angled forward towards the end wall, the sloped edges received in the first and second retainers.

5. The combustor of claim 1, wherein further comprising at least one spring member arranged to resiliently support the liner.

6. The combustor of claim 5, wherein the at least one spring member comprises a first spring arranged at a first intersection of the end wall and the first liner wall and a second spring arranged at a second intersection of the end wall and the second liner wall.

7. The combustor of claim 5, wherein the at least one spring member is attached to the support.

8. The combustor of claim 1, wherein at least one of the first and second liner walls include at least one through-hole.

9. The combustor of claim 1, wherein the support includes perforations configured to facilitate impingement cooling of the combustor.

10. The combustor of claim 1, wherein the first retainer is a hook extending forward towards the end wall and the second retainer is a hook extending forward towards the end wall.

11. The combustor of claim 1, wherein the support further comprises a bulkhead arranged forward of the end wall.

12. A gas turbine engine, comprising:
   a fuel nozzle;
   a combustion chamber in fluid communication with the fuel nozzle, the combustion chamber defined by a liner, the liner including a first liner wall and a second liner wall spaced apart from the first liner wall, and an end wall joining the first and second liner walls at a forward end; and
   a support configured to resiliently support the liner, the support including a first support wall and a second support wall spaced apart from the first support wall, the first and second support walls having a first retainer and a second retainer, respectively, the first retainer configured to capture an aft end of the first liner wall and the second retainer configured to capture an aft end of the second liner wall.

13. The gas turbine engine of claim 12, wherein the fuel nozzle is in fluid communication with the combustion chamber via a through-hole in the end wall.

14. The gas turbine engine of claim 12, wherein at least one of the first liner wall, the second liner wall, and the end wall includes a ceramic matrix composite material.

15. The gas turbine engine of claim 12, wherein the support includes a metallic material.

16. The gas turbine engine of claim 12, wherein the first liner wall and the first support wall are radially outward from the second liner wall and the second support wall, respectively, with respect to a central engine axis.

17. The gas turbine engine of claim 12, wherein the support includes at least one spring member arranged to resiliently support the liner.

18. A method of assembling a combustor for a gas turbine engine, comprising:
   providing a support, the support including a first support wall and a second support wall spaced apart from the first support wall, the first and second support walls having a first retainer and a second retainer, respectively;
   resiliently mounting a liner to the support, the liner including a first liner wall and a second liner wall spaced apart from the first liner wall, the first and second liner walls defining a combustion chamber therebetween, an end wall joining the first and second liner walls at a forward end; and
   capturing an aft end of the first liner wall and an aft end of the second liner wall in the first and second retainers, respectively.

19. The method of claim 18, further comprising providing at least one spring member between the liner and the support.

20. The method of claim 18, wherein the second support wall is provided subsequent to resiliently mounting the liner to the support.

* * * * *